United States Patent [19]

Tsujimoto et al.

[11] 4,036,805
[45] July 19, 1977

[54] COLORING OF THE ORGANIC MATERIALS WITH NAPHTHACENEQUINONES

[75] Inventors: Michihiro Tsujimoto, Tachikawa; Ichiro Okubo, Hachioji, both of Japan

[73] Assignee: Mitsui Toatsu Chemicals, Incorporated, Tokyo, Japan

[21] Appl. No.: 379,482

[22] Filed: July 16, 1973

[30] Foreign Application Priority Data

July 28, 1972  Japan .................................. 47-75044

[51] Int. Cl.² .................... C08L 77/02; C08L 67/02; C08L 23/08; D08P 1/20
[52] U.S. Cl. ........................................ 260/37 N; 8/4; 8/39 R; 8/39 C; 8/396; 8/40; 8/179; 260/37 NP; 260/37 P; 260/39 P; 260/40 R; 264/78
[58] Field of Search ............... 8/179, 39 R, 39 C, 40, 8/1 W; 264/37 NP, 37 N, 39 P

[56] References Cited
U.S. PATENT DOCUMENTS

| 2,663,612 | 12/1953 | Gibson ........................... 8/176 X |
| 2,898,177 | 8/1959 | Rosch ............................... 8/34 |
| 3,074,975 | 1/1963 | McCormick et al. .... 260/559 AT X |

OTHER PUBLICATIONS

The Chemistry of Synthetic Dyes, vol. III, pp. 394 and 404, 1970 Academic Press.
Chemische Berichte, vol. 83, pp. 178–181, 1950.
Chemical Abstracts, vol. 44, pp. 9399–9401, 1950.
Marschak et al., Bull. Soc. Chem. Fr. 1948, pp. 418–428.
Bentley et al., J. Chem. Soc., vol. 91, No. 411–435, 1907.

*Primary Examiner*—Donald Levy
*Attorney, Agent, or Firm*—Fischer, Christen & Sabol

[57] ABSTRACT

Method of coloring an organic material with the naphthacenequinone derivative having the formula:

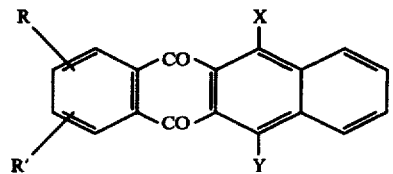

wherein X is —OH, —NH$_2$, —NHR″ wherein R″ is lower alkyl or aryl group, Y is —H, —Cl, —OH, —OR‴ —SR‴, —NH$_2$, —NHR‴, methyl, cyclohexyl or benzyl group wherein R‴ is aryl or alkyl which may be substituted with lower alkoxy or lower alkylthio group, R and R′ is —H, —Cl, —CH$_3$, —OCH$_3$, phenyl group or may together form a benzene ring. Colored organic materials with the compound exhibit brilliant nuance with characteristic fluorescence.

8 Claims, No Drawings

COLORING OF THE ORGANIC MATERIALS WITH NAPHTHACENEQUINONES

BACKGROUND OF THE INVENTION

This invention relates to a method for the coloring of the organic materials with the naphthacenequinone derivatives.

Hitherto it has been scarcely known to use naphthacenequinone derivatives as dystuff, except it is described that the sulfonated compounds obtained by treating the naphthacenequinone derivatives with concentrated sulfuric acid can be used as the acid dye for wood (for example: Journal of the chemical Society Vol. 91, 411 - 435 (1907). Furthermore, from the fact that these derivatives are not described in "Colour index, 2nd Edition (1956) and its Supplement (1963)" edited by the Society of Dyers & Colourists and the American Association of Textile Chemists and colourists and in "The Chemistry of Synthetic Dyes, Vol. I & II (1952) and Vol. III (1970)" written by k. Venkataramann, etc., it is obvious that the naphthacenequinone derivatives have not been used at all as dyestuff on sale. We, inventors, as a result of the intensive colorant test of the organic materials on the naphthacenequinone derivatives which hitherto known only as the intermediates for dyestuffs, disclosed that the compounds of the formula (I), defined later on, colored the organic high molecular weight compounds in brilliant nuance with characteristic fluorescence, and thus completed the invention.

Besides, α-aminoanthraquinone, the most important intermediate for reddish disperse anthraquinone dye, is produced at present by amination of anthraquinone-1-sulfonic acid obtained by sulfonation of anthraquinone under the presence of mercury catalyst. Recently, it has been intensely demanded to avoid the environment pollution by mercury of chemical industry. In contrast, the naphthacenequinone derivatives used in this invention can be obtained without using mercury and can color in more brilliant nuance than the anthraquinone derivatives. Therefore, we think that the industrial merit of this invention is great.

SUMMARY OF THE INVENTION

This invention relates to the method of coloring an organic material with the naphthacenequinone derivative having the formula:

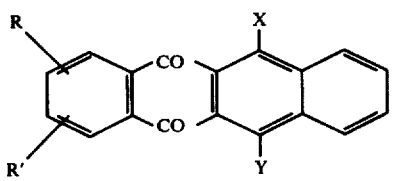

(I)

wherein x is a member selected from the group consisting of hydroxyl group, —OR", —SR", amino group and —NHR" wherein R" is a member selected from the group consisting of lower alkyl group and phenyl group which may be optionally substituted with a member selected from the group consisting of methyl group, lower alkoxy group, lower alkylthio group and halogen atom, y is a member selected from the group consisting of hydrogen atom, chlorine atom, hydroxyl group, lower alkoxy group, lower alkylthio group, phenoxy group which may be optionally substituted with a member selected from the group consisting of methyl group, methoxy group and chlorine atom, thiophenyl group which may be optionally substituted with a member selected from the group consisting of methyl group, lower alkoxy group and chlorine atom, amino group, lower alkylamino group the alkyl group of which may be optionally substituted with a member selected from the group consisting of hydroxyl group, lower alkoxy group and lower alkylthio group, benzylamino group, phenylsulfonylamino group the phenyl group of which may be optionally substituted with lower alkyl group, lower alkyl sulfonylamino group, cyclohexylamino group, phenylamino group the phenyl group of which may be optionally substituted with a member selected from the group consisting of lower alkyl group, lower alkoxy group, lower alkylthio group and chlorine atom, methyl group, cyclohexyl group and benzyl group, R and R' each is a member selected from the group consisting of hydrogen atom, chlorine atom, methyl group, methoxy group and phenyl group, R and R' may together form a benzene ring.

Organic materials which can be colored according to the present invention include any synthetic or semisynthetic high molecular weight compound which can be practically used as fibrous article, film, extrudate, casting or molded article including synthetic or semisynthetic resin such as amino-formaldehyde resin, for example, urea-formaldehyde or melamine-formaldehyde resin, polymer and copolymer of methacrylic acid ester, polymer and copolymer of vinyl chloride, polymer and copolymer of vinyliden chloride, polymer and copolymer of olefin, for example, polyethylene and polypropylene, styrene polymer and copolymer, polyamide resin, polyester resin, polyacrylic resin, polyacetal resin and cellulose ester.

DETAILED DESCRIPTION OF THE INVENTION

The compounds of the formula (I) used in this invention are well known, for example, the compound of the formula (II) is obtained under the description of Journal of the Chemical Society Vol. 91, p. 416 - 417 as follows:

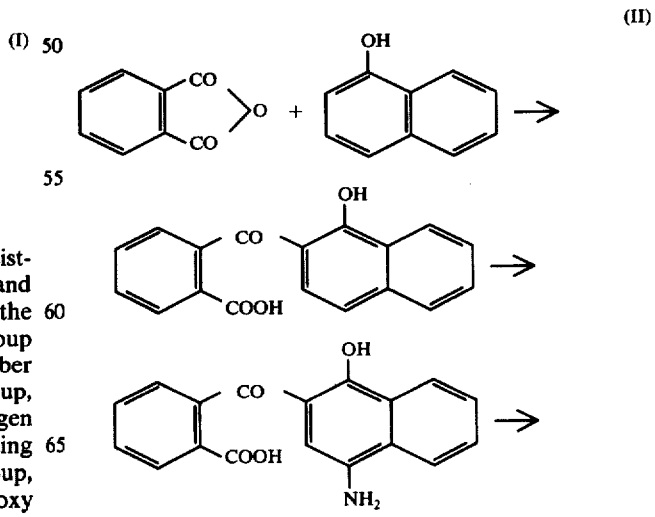

(II)

-continued

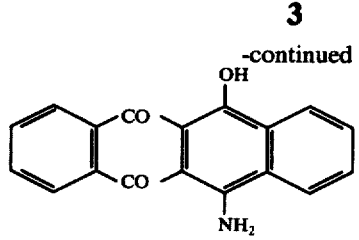

The compounds of the formula (I) having alkoxyl group and like, are obtained from halogen substituted compounds by the action of alkali alcoholates and like, for example, from the compound of the formula (III) and sodium methylate the compound of the formula (IV) is obtained:

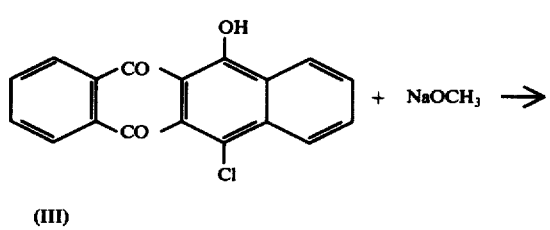

Also, using substituted phthalic anhydrides and naphthols, the compounds of the formula (V) are obtained:

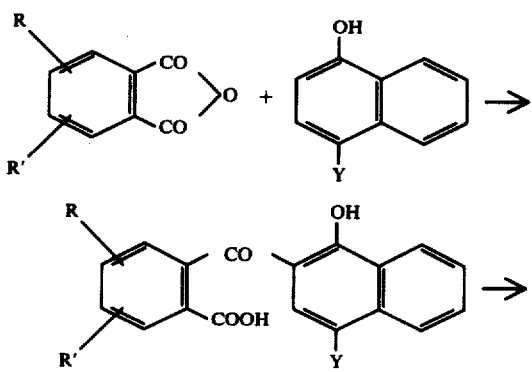

-continued

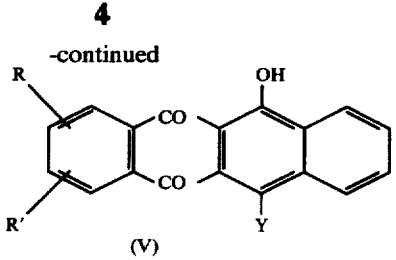

For example, the compound of the formula (VIII) is obtained from 4-methylphthalic anhydride (VI) and 4-Chloro-1-naphthol (VII):

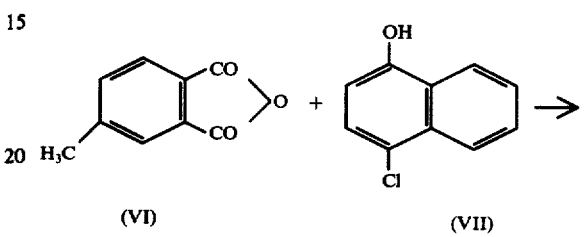

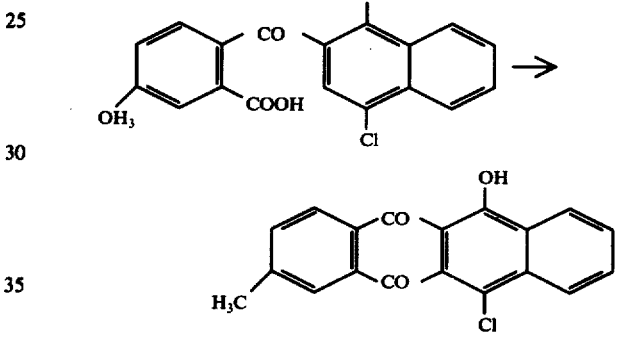

Therefore, it has no need to describe the synthesizing method of the compounds of the formula (I) specifically.

We, inventers, as a result of the intensive examinations on the compounds of the formula (I) as the colorants of the organic materials, disclosed that the compounds of the formula (I) colored the organic high molecular weight compounds in brilliant nuance ranging from yellow to blue shades with fluoroscence and that the light fastness of colored articles was excellent.

In table I, the typical examples of the compounds used for this invention are shown although the present invention is not limited thereto. The shade of a polyester fabric dyed therewith using a dyeing procedure such as that described in Example 1 or 2, is specified.

Table I

| Compound No. | Structural formula | Shade of the Polyester dyed article |
| --- | --- | --- |
| 1 | 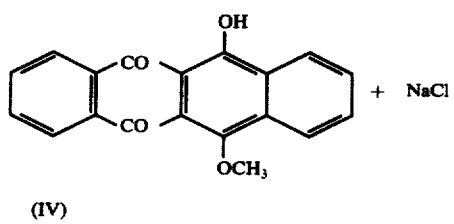 | Yellow |

Table I-continued

| Compound No. | Structural formula | Shade of the Polyester dyed article |
|---|---|---|
| 2 | (phthaloyl fused to 1-hydroxy-4-methyl-naphthalene) | " |
| 3 | (phthaloyl fused to 1-hydroxy-4-cyclohexyl-naphthalene) | " |
| 4 | (phthaloyl fused to 1-hydroxy-4-benzyl-naphthalene) | " |
| 5 | (phthaloyl fused to 1-hydroxy-4-chloro-naphthalene) | " |
| 6 | (4-methylphthaloyl fused to 1-hydroxy-naphthalene) | " |
| 7 | (3-chlorophthaloyl fused to 1-hydroxy-naphthalene) | " |
| 8 | (4-chlorophthaloyl fused to 1-hydroxy-naphthalene) | " |
| 9 | (phthaloyl fused to 1-hydroxy-4-methoxy-naphthalene) | " |
| 10 | (phthaloyl fused to 1,4-dibutoxy-naphthalene) | " |

Table I-continued

| Compound No. | Structural formula | Shade of the Polyester dyed article |
|---|---|---|
| 11 | [structure: phthaloyl fused naphthalene with SCH₃ at 1 and 4 positions] | " |
| 12 | [structure: phthaloyl fused naphthalene with OH at 1 and O-phenyl at 4] | " |
| 13 | [structure: phthaloyl fused naphthalene with OH at 1 and S-(4-tolyl) at 4] | " |
| 14 | [structure: phthaloyl fused naphthalene with OH at 1 and S-(4-chlorophenyl) at 4] | " |
| 15 | [structure: phthaloyl fused naphthalene with OH at 1 and S-(4-methoxyphenyl) at 4] | " |
| 16 | [structure: phthaloyl fused naphthalene with O-(2-chloro-4-methylphenyl) at both 1 and 4 positions] | " |
| 17 | [structure: phthaloyl fused naphthalene with OH at 1 and O-(4-methoxyphenyl) at 4] | " |

Table I-continued

| Compound No. | Structural formula | Shade of the Polyester dyed article |
|---|---|---|
| 18 | (naphthalene with OH, fused phthaloyl (CO-CO to benzene), OCH$_2$CH$_2$SCH$_3$) | " |
| 19 | (naphthalene with OH, fused phthaloyl, SCH$_2$CH$_2$OC$_2$H$_5$) | " |
| 20 | (naphthalene with OH, fused phthaloyl, OCH$_2$CH$_2$OCH$_3$) | " |
| 21 | (naphthalene with OH, fused phthaloyl, NH·SO$_2$–C$_6$H$_4$–CH$_3$) | Orange |
| 22 | (naphthalene with OH, fused phthaloyl, NH·SO$_2$CH$_3$) | " |
| 23 | (naphthalene with OH, fused phthaloyl, NH$_2$) | Pink |
| 24 | (naphthalene with OH and NH$_2$, fused to 4-methoxyphthaloyl, CH$_3$O-) | " |
| 25 | (naphthalene with OH and NH$_2$, fused to 4-methylphthaloyl, CH$_3$-) | " |
| 26 | (naphthalene with OH and NH$_2$, fused to 4,5-dimethylphthaloyl, CH$_3$, CH$_3$) | " |

Table I-continued

| Compound No. | Structural formula | Shade of the Polyester dyed article |
|---|---|---|
| 27 | (4-chlorophenyl fused with dicarbonyl to naphthalene with OH and NH₂) | " |
| 28 | (phenyl fused with dicarbonyl to naphthalene with OH and NH-C₆H₄-CH₃) | Red Violet |
| 29 | (phenyl fused with dicarbonyl to naphthalene with OH and NH-C₆H₄-Cl) | " |
| 30 | (phenyl fused with dicarbonyl to naphthalene with OH and NH-C₆H₄-OCH₃) | " |
| 31 | (phenyl fused with dicarbonyl to naphthalene with OH and NH-C₆H₄-SCH₃) | " |
| 32 | (phenyl fused with dicarbonyl to naphthalene with OH and NH-C₆H₄-SO₂CH₃) | Brown |
| 33 | (phenyl fused with dicarbonyl to naphthalene with OH and NH-cyclohexyl) | Orange Red |

Table I-continued

| Compound No. | Structural formula | Shade of the Polyester dyed article |
|---|---|---|
| 34 | (structure: phthaloyl-fused naphthalene with OH and NHC$_2$H$_4$OH substituents) | " |
| 35 | (structure: phthaloyl-fused naphthalene with OH and NHCH$_2$CH$_2$CH$_2$SCH$_3$ substituents) | " |
| 36 | (structure: phthaloyl-fused naphthalene with OH and NHCH$_2$CH$_2$OCH$_3$ substituents) | " |
| 37 | (structure: phthaloyl-fused naphthalene with OH and NH—CH$_2$—phenyl substituents) | " |
| 38 | (structure: phthaloyl-fused naphthalene with two NH-phenyl substituents) | Violet Blue |
| 39 | (structure: phthaloyl-fused naphthalene with two NH-(4-methylphenyl) substituents) | " |
| 40 | (structure: phthaloyl-fused naphthalene with two NH-(3-chlorophenyl) substituents) | " |

Table I-continued

| Compound No. | Structural formula | Shade of the Polyester dyed article |
|---|---|---|
| 41 | [structure: phthaloyl-naphthalene with two NH-C6H4-OCH3 groups] | " |
| 42 | [structure: phthaloyl-naphthalene with two NH-C6H4-SCH3 groups] | " |
| 43 | [structure: phthaloyl-naphthalene with NH2 and NH-C6H5] | Violet |
| 44 | [structure: phthaloyl-naphthalene with NH2 and NH-C6H4-OCH3] | " |
| 45 | [structure: phthaloyl-naphthalene with NH2 and NH-C6H4-CH3] | " |
| 46 | [structure: phthaloyl-naphthalene with two NH2 groups] | " |

Table I-continued

| Compound No. | Structural formula | Shade of the Polyester dyed article |
|---|---|---|
| 47 | | Yellow |
| 48 | | " |
| 49 | | Red |
| 50 | | Orange Yellow |
| 51 | | Brownish Yellow |
| 52 | | " |
| 53 | | Violet |
| 54 | | Yellow |

Organic materials can be easily colored with the compounds of the formula (I) by any ordinarily practiced method. For example, fibrous materials, such as yarns and fabrics, can be colored by fixing it, at 50° to 140° C, in aqueous medium by the conventional exhausting method or at a proper temperature (e.g. 100° to 200° C.) consistent with the type of fiber using dry heat by the conventional thermosol method.

Further, when the organic material to be colored is a film, coating, casting or a molded or extruded article, it can be colored by adding and mixing the compounds of the formula (I), i.e., resin or polymer, from which it is made during its preparation or before or during the forming of the substance into a film, coating, casting or a molded or extruded article. Also, a resin-based pigment having yellow or red fluorescent color can be obtained by mixing the compounds of the formula (I) into the resin or polymer or other properly selected organic materials in molten form.

The following examples are presented in which all parts are on a weight basis and the compound No. refers to the compounds described in Table I.

EXAMPLE 1

1 part of Compound No.23 (6-hydroxy-11-aminonaphthacenequinone-5, 12) was ground together with 0.5 part of sodium alkyl benzene sulfonate type of alkylaryl-polyoxyethylene ether type surface active agent and 2 parts of water for a sufficient time to provide a finely grandulated powder which was diluted with water to provide 10 parts of a finely granulated aqueous dispersion. 2 parts of this dispersion were added to aqueous bath containing 1 part of a higher alcohol sulfate type surface active agent to provide 500 parts of treating bath. 10 parts of polyester cloth was immersed in this treating bath maintained at 130° C. for 40 minutes and was water-washed and dried. The obtained dyed cloth showed a clear pink color having an orange fluorescence and its light-fastness was higher than the 5th grade (JIS L 0842-171). Similarly, dyed cloth showing similar color, having similar fluorescence and light fastness was obtained by using, instead of Compound No.23 mentioned above, Compound No.24, 26 and 27 respectively.

EXAMPLE 2

1 part of the finely granulated sample of Compound No.1 (6-hydroxynaphthacenequinone) obtained in the same manner as described in example 1, was dispersed in 20 parts of water containing 0.04 part of a polyoxyethylene alkyl ether type surface active agent.

A polyester cloth was dipped in this aqueous dispersion and impregnated with the dispersion at a pick up of 40 – 50%. This treated cloth was dried, heat treated at 180° C. for 1 minute, washed with a dilute surface active agent solution and was water-washed and dried to provide a dyed cloth of clear yellow color having a yellow fluorescence and excellent light fastness.

Similarly, dyed cloth showing similar color, having similar fluorescence and light fastness was obtained by using, instead of Compound No.1 mentioned above, Compound No.2, 5, 6, 12 and 13 respectively.

EXAMPLE 3

In the same manner as described in example 1, instead of the polyester cloth, a polyamide cloth is treated at 98° C. and a acetate cloth is treated at 80° C. to obtain respectively the same effect as obtained in example 1.

EXAMPLE 4

A uniform mixture consisting of 0.1 part of 6, 11-dihydroxynaphthacenequinone-5, 12, 50 parts of polyvinyl-chloride and 50 parts of dioctyl phthalate was kneaded at 150° C. for 10 minutes and was then pressed for 5 between minutes metal plates heated to 160° C. to make a sheet of a thickness of about 0.5 mm.

The obtained sheet showed a clear orange color emitting a yellow fluorescence.

Similarly, colored sheet showing clear yellowish color, emitting similar fluorescence was obtained by using, instead of the above mentioned compound, Compound No.50 and 51 respectively.

EXAMPLE 5

20 parts of an unmodified melamine formaldehyde resin were mixed into 50 parts of a sulfonamide resin melted at 120° C. The resulting mixture was heated to 170°– 180° C. and 1 part of Compound No.49 (2,3-benzo-6-hydroxy-11-aminonaphthacenequinon-5, 12) was mixed into the mixture. The mixture was completely dissolved, then cooled, solidified and then crushed to obtain a red fluorescence pigment emitting an orange fluorescence.

Similarly, pigment showing similar color, emitting similar fluorescence was obtained by using, instead of Compound No.49 mentioned above, Compound No.23, 33 and 36 respectively.

EXAMPLE 6

1 part of Compound No.43 (6-amino-11-anilinonaphthacenequinone-5, 12) was added to 1000 parts of polystyrene, kneaded at 180° C. for a few minutes and was then pressed to a plate 5 mm. thick.

The obtained polystyrene plate showed a violet color emitting a red fluorescence.

Similarly, colored plate showing similar color, emitting similar fluorescence was obtained by using, instead of Compound No.43 mentioned above, Compound No.30, 44, 45 and 46 respectively.

What is claimed is:

1. A method which comprises coloring a synthetic organic high molecular weight compound or cellulose ester with a naphthacenequinone derivative having the formula:

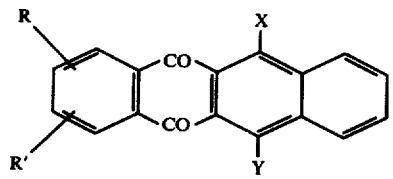

wherein:

X is hydroxyl and Y is hydrogen, chlorine, hydroxyl, lower alkoxy *or lower alkoxy* the alkyl group of which *is* substituted with lower alkoxy or lower alkylthio, phenoxy *or phenoxy* which *is* substituted with methyl *or* methoxy, amino, phenylsulfonylamino *or phenylsulfonylamino* the phenyl group of which *is* substituted with lower alkyl, phenylamino, methyl, cyclohexyl or benzyl, *or X and Y each is simultaneously amino or phenylamino;* and R and R' each is hydrogen, chlorine *or* methyl, or R and R' together form a benzene ring.

2. The method as claimed in claim 1 wherein X is hydroxyl and Y is hydrogen, chlorine, hydroxyl, lower alkoxy, amino, phenylsulfonylamino or phenylsulfonylamino the phenyl group of which is substituted with lower alkyl, or phenylamino, or X and Y each is simultaneously amino or phenylamino.

3. The method as claimed in claim 1 wherein X is hydroxyl and Y is hydrogen, chlorine, hydroxyl, lower alkoxy, phenylsulfonylamino or phenylamino, or X and Y each is simultaneously amino or phenylamino; and R and R' each is hydrogen.

4. The method as claimed in claim 1 wherein the naphthacenequinone derivative is the compound having the formula:

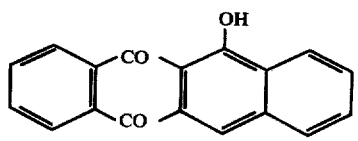

5. The method as claimed in claim 1 wherein the naphthacenequinone derivative is the compound having the formula:

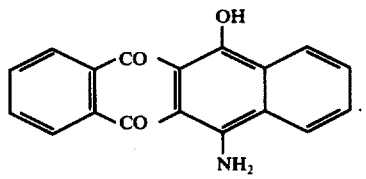

6. The method as claimed in claim 1 wherein the naphthacenequinone derivative is the compound having the formula:

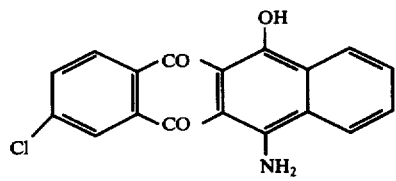

7. The method as claimed in claim 1 wherein the naphthacenequinone derivative is the compound having the formula:

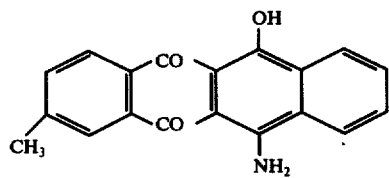

8. The method as claimed in claim 1 wherein the naphthacenequinone derivative is the compound having the formula:

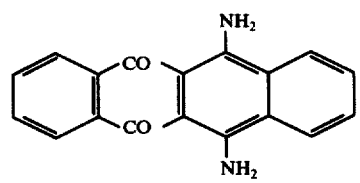

* * * * *